(12) United States Patent
Seferian (10) Patent No.: US 6,888,469 B2
(45) Date of Patent: May 3, 2005

(54) METHOD AND APPARATUS FOR ESTIMATING SEMICONDUCTOR JUNCTION TEMPERATURE

(75) Inventor: Mark Seferian, Tiverton, RI (US)

(73) Assignee: Copley Controls Corporation, Canton, MA (US)

( * ) Notice: Subject to any disclaimer, the term of this patent is extended or adjusted under 35 U.S.C. 154(b) by 121 days.

(21) Appl. No.: 10/335,985

(22) Filed: Jan. 2, 2003

(65) Prior Publication Data

US 2004/0131104 A1 Jul. 8, 2004

(51) Int. Cl.$^7$ .................. G08B 19/00; G08B 21/00; G01R 31/26; H02H 5/04; H02H 3/00; H02H 3/08; H02H 7/00

(52) U.S. Cl. .................. 340/640; 340/522; 340/653; 324/765; 324/766; 324/767; 324/768; 324/769; 361/93.1; 361/93.8; 361/100; 361/103; 361/106

(58) Field of Search .................. 340/522, 653, 340/640; 361/93.1, 93.8, 100, 103, 106; 324/765–769

(56) References Cited

U.S. PATENT DOCUMENTS 3,564,293 A * 2/1971 Mungenast .................. 327/378
3,622,849 A * 11/1971 Kelley et al. ................ 361/100
4,001,649 A * 1/1977 Young ......................... 361/106
4,052,744 A * 10/1977 Boothman et al. ........... 361/103
5,249,141 A    9/1993 Vandebroek et al. ........ 364/557

* cited by examiner

Primary Examiner—Jeffery Hofsass
Assistant Examiner—Lam Pham
(74) Attorney, Agent, or Firm—Weingarten, Schurgin, Gagnebin & Lebovici LLP (57) ABSTRACT

An apparatus is disclosed that provides an estimate of the semiconductor junction temperature of a semiconductor device as a function of the electrical current flowing across the corresponding semiconductor junction. The apparatus includes a current sensor that samples and measures the current flowing across the semiconductor junction and provides an output signal indicative of the measured value to a current-to-temperature converter. The current-to-temperature converter estimates the temperature of the semiconductor junction using equations that include constants empirically derived for the particular device configuration including cooling and mounting methods used with it. The current-to-temperature converter provides an output temperature signal that is compared to a predetermined temperature threshold value, and in the event that the output temperature signal exceeds the predetermined temperature threshold value, an alarm signal is set.

19 Claims, 6 Drawing Sheets

METHOD AND APPARATUS FOR ESTIMATING SEMICONDUCTOR JUNCTION TEMPERATURE

CROSS REFERENCE TO RELATED APPLICATIONS

N/A

STATEMENT REGARDING FEDERALLY SPONSORED RESEARCH OR DEVELOPMENT

N/A

FIELD OF THE INVENTION

This invention relates to the estimating the junction temperature of semiconductor devices, and in particular to estimating the junction temperature of a semiconductor device as a function of the output current.

BACKGROUND OF THE INVENTION

Almost all high power and high current semiconductor devices employ some type of protection to prevent excess current from overheating the semiconductor junctions and damaging them. Typically, this protection includes current limiting circuits that limit the amplitude of the current flowing through the semiconductor device. However, in some applications such as Magnetic Resonance Imaging (MRI), high amplitude current pulses are needed that may exceed the maximum current value of a semiconductor device for a brief period of time. These high amplitude pulses are needed to achieve a high signal-to-noise ratio and reduce the length of time a patient is scanned. Typically, these current pulses are shaped such that the RMS value of the current stays below the prohibited value, but in systems in which current limiters are employed, these current pulses can not be used since the current limiters will limit the amplitude of the pulse regardless of the pulse shape. Thus, current pulses having lower amplitudes and longer periods must be used to achieve the desired results, such as the higher signal to noise ratio in a MRI system. Thus, it is not necessarily the amplitude of the current flowing through the semiconductor device that is important in terms of overheating the semiconductor junction, but rather, the junction temperature itself that is important.

Monitoring the junction temperature is difficult however, since the semiconductor junction is very small and is not easily physically accessible. Semiconductor devices do exist that include integral junction temperature sensors, but in general these semiconductor devices are unable to be used at the high currents required in high power applications.

Therefore, it would be desirable for a system to determine the junction temperature of a high current semiconductor devices and other semiconductor devices without the need to make difficult measurements.

BRIEF SUMMARY OF THE INVENTION

An apparatus and corresponding method are disclosed that provides an estimate of the semiconductor junction temperature of a semiconductor device as a function of the electrical current flowing across the corresponding semiconductor junction. The apparatus includes a current sensor that samples and measures the current flowing across the semiconductor junction and provides an output signal indicative of the measured value to a current-to-temperature converter. The current-to-temperature converter estimates the temperature of the semiconductor junction using equations that include constants empirically derived for the particular device configuration including cooling and mounting methods used with it. The current-to-temperature converter provides an output temperature signal that is compared to a predetermined temperature threshold value, and in the event that the output temperature signal exceeds the predetermined temperature threshold value, an alarm signal is provided that in one embodiment can be used to shut down the transistor.

In one embodiment, an apparatus is disclosed for estimating a semiconductor junction temperature of first and second semiconductor devices that provide respective positive and negative output current to a common output node. The apparatus includes a current sensor coupled to the common output node that samples and measures the positive and negative output currents provided by the first and second semiconductor devices respectively. The current sensor provides an output sensor signal that is indicative of the magnitude and polarity of the output current. A switching module is coupled to the current sensor and switches the output sensor signal to a first output if the output sensor signal has a positive polarity and switches the output sensor signal to a second output if the output current signal has a negative polarity.

A positive channel processor is coupled to the first output of the switching module and converts the positive output sensor signal into a first temperature signal that is an estimate of the semiconductor junction temperature in the first semiconductor device. A negative channel processor is coupled to the second output of the switching module and converts the negative output sensor signal into a second temperature signal that is an estimate of the semiconductor junction temperature in the second semiconductor device. An output module is coupled to the positive and negative channels and receives the first and second temperature signals therefrom. The output module compares the first and second temperature signals to a predetermined constant, and if either the first or second temperature signals exceeds the predetermined constant, the output module provides an output alarm signal that indicates that the semiconductor junction is overheating in either the first and/or second semiconductor device.

The positive channel processor includes a current-to-power converter coupled to the first output of the switching module. The current-to-power converter receives the output sensor signal and determines the value of the power dissipated in the semiconductor junction of the first semiconductor device as a function of the sensed and measured output current. A low pass filter is coupled to the current-to-power converter and provides a filtered power value. The positive channel processor further includes a power-to-temperature converter coupled to the low pass filter and receives the filtered power value therefrom. The power-to-temperature converter and provides as an output, the first temperature value of the semiconductor junction in the first semiconductor device.

The negative channel processor includes a current-to-power converter coupled to the second output of the switching module. The current-to-power converter receives the output sensor signal and determines the value of the power dissipated in the semiconductor junction of the second semiconductor device as a function of the sensed and measured output current. A low pass filter is coupled to the current-to-power converter and provides a filtered power value. The negative channel processor further includes a power-to-temperature converter coupled to the low pass filter and receives the filtered power value therefrom. The power-to-temperature converter and provides as an output, the temperature value of the semiconductor junction in the second semiconductor device.

BRIEF DESCRIPTION OF THE SEVERAL VIEWS OF THE DRAWING

The invention will be more fully understood by reference to the following Detailed Description of the Invention in conjunction with the Drawing of which.

DETAILED DESCRIPTION OF THE INVENTION

In the embodiments depicted herein, semiconductor devices, which are typically transistors, are depicted in the drawings that follow as generic three-terminal semiconductor devices. The junction temperature estimator described herein works with any transistor, e.g., bipolar, MOSFET, IGBT, or other high current switching semiconductor device, such as an SCR. The apparatus and corresponding method described herein can be used to monitor current in real time and to provide an alarm signal or a control signals to shut down the respective semiconductor device or devices in the event that an actual junction temperature is determined to be overheating. In addition, the apparatus and methods described herein can also be implemented in software as a simulator to estimate the semiconductor junction temperatures in one or more virtual semiconductor devices configured in a virtual electronic circuit. This allows a user to test virtual current pulses in the virtual semiconductor devices prior to applying actual current pulses to actual semiconductor devices. As a simulator, the methods and apparatus can be implemented in a suitable software language and executed using a suitable computer.

Figure 1:
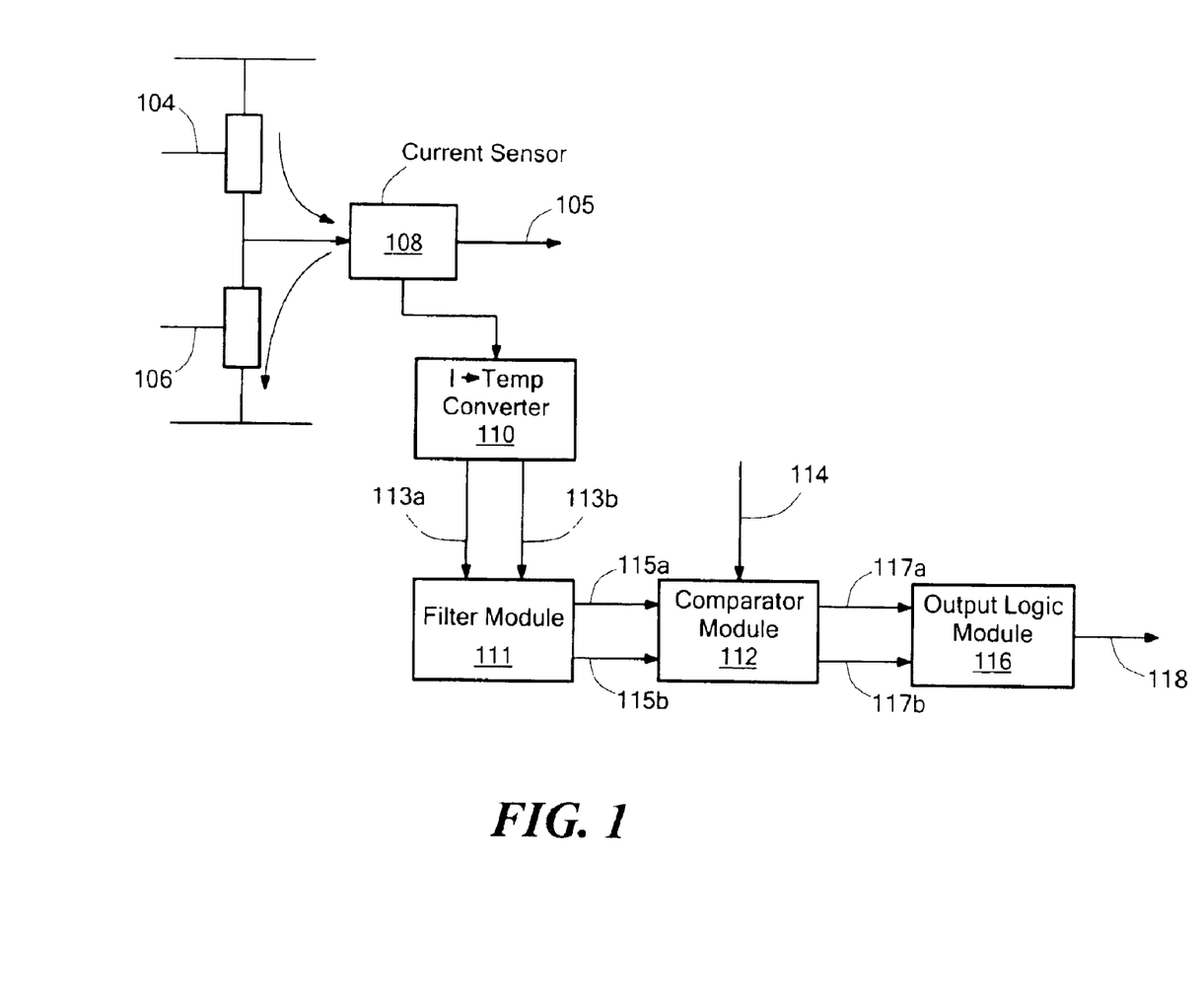
FIG. 1 is a block diagram of one embodiment of the present invention.

FIG. 1 depicts an embodiment of the junction temperature estimator in accordance with the present invention. In the descriptions that follow, it should be appreciated that the various modules can be implemented in software and executed on a microprocessor, or digital signal processor, as a sequence of programming commands, or the various modules can be designed using specifically designed hardware. In particular, first and second transistors 104 and 106, respectively, are electrically connected together at junction 103 such that the first transistor 104 supplies positive current, i.e. sources current, and the second transistor 106 supplies negative current, i.e. sink current. Depending on the application, the input signal (not shown), and the biasing network (not shown), the two transistor configuration operates in a saturation mode to switch high currents. For example, the circuit configuration can be a half bridge current switching configuration, a complementary amplifier pair, or other two transistor configuration in which the pair of transistors 104 and 106 that are operated in saturation and are connected at a junction 103 and provide output current 105 thereto. In addition, the two transistors may be coupled together to the common node via a circuit that can include one or more chokes or resistors.

The output current 105 is sampled by current sampler 108 and provided to a current-to-temperature converter module 110. The current-to-temperature converter module 110 receives the output current 105 as an input, and provides as outputs first and second temperature signals, 113a and 113b, respectively. The first and second temperature signals 113a and 113b correspond to the nearly instantaneous junction temperature of the first and second transistors respectively. The first and second temperature signals 113a and 113b are averaged in filter module 111 and the first and second filtered temperature signals, 115a and 115b, respectively, are provided to comparator 112. Comparator 112 compares the first and second filtered temperature signals 115a and 115b to a predetermined temperature threshold value 114 and provides outputs 117a and 117b that are indicative if either of the first and second filtered temperature signals 115a 115b are greater than the value of a predetermined threshold signal 114. Output logic module 116 receives the two outputs 117a and 117b from comparator module 112, and in the event that either of the filtered temperature signals 115a and 115b exceeds the predetermined temperature threshold value, output logic module 116 provides an alarm signal 118. If the embodiment depicted in FIG. 1 is to be used as a simulator, the current sensor 108 is a user input current module, wherein the user provides as an input to the simulator a virtual current pulse.

Figure 2:
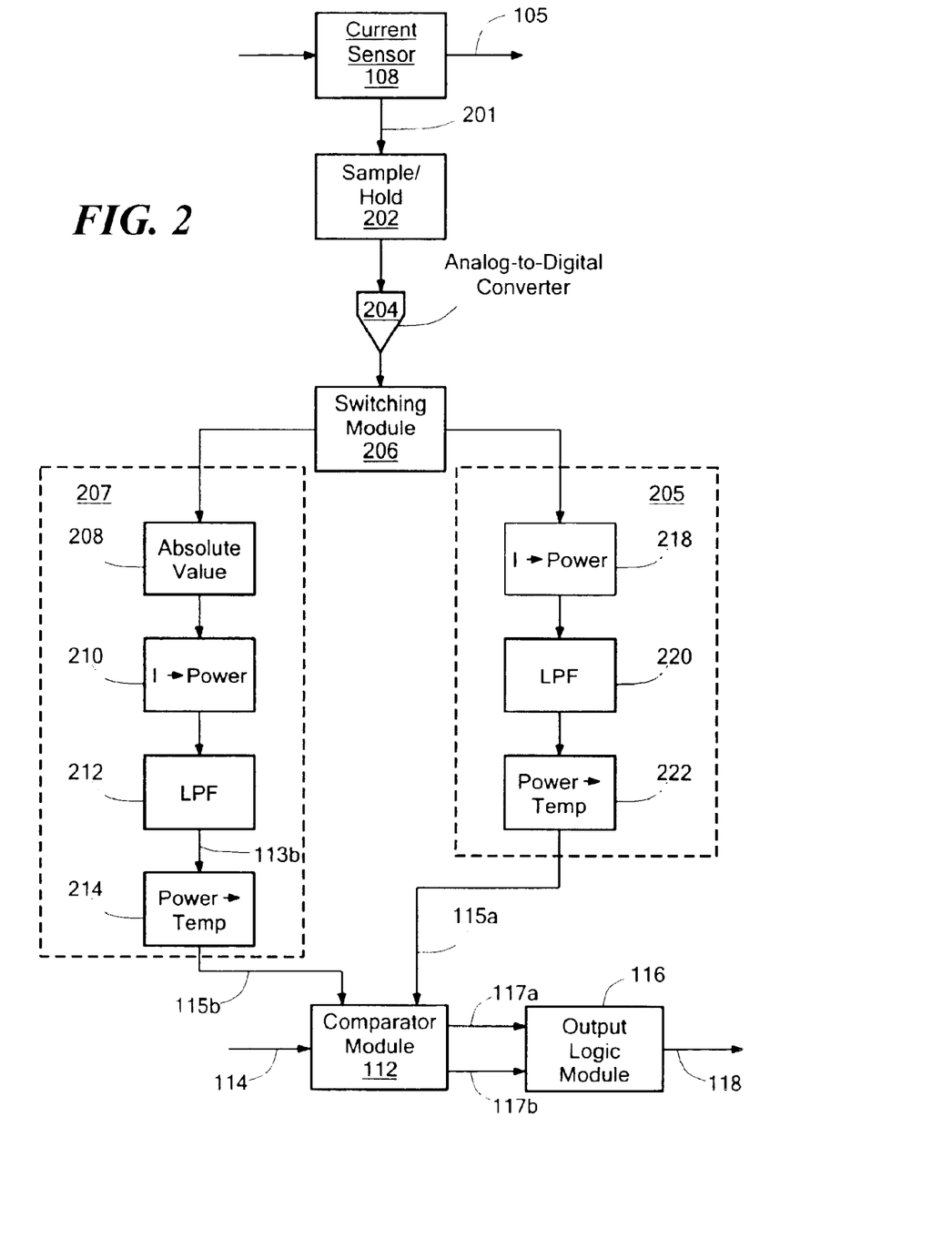
FIG. 2 is a more detailed block diagram of the embodiment of the present invention depicted in FIG. 1.

FIG. 2 depicts a more detailed block diagram of the embodiment of the present invention depicted in FIG. 1. In particular, output current 105 is sensed by current sensor 108 that provides an analog signal 201 that is indicative of the magnitude and polarity of output current 105. Signal 201 is provided to an analog-to-digital converter 204, that may include a sample and hold module, or an external sample and hold module (not shown) may be used if needed. Analog-to-digital converter 204 converts the analog signal 201 into a digital value that is representative of the magnitude and polarity of the analog signal 201 and therefore output current 105. Switching logic 206 detects if the polarity of the digital value is positive or negative and routes the digital value to the positive channel 205 or the negative channel 207, respectively, for processing thereby. As discussed above, the first transistor 104 provides the positive current component of output current 105 and the second transistor 106 provides the negative current component of output current 105. By separating the processing of the positive and negative currents, the junction temperatures of the first and second transistors 104 and 106, are determined independently of one another.

In the illustrative embodiment, the positive and negative channels 205 and 207 process the positive and negative currents using the same processing steps, except for the inclusion of an absolute value module in the negative channel 207. In the event that the output current is negative, the negative channel 207 first determines the absolute value of the negative current using an absolute value module 208. From this point on, the following description of the processing of the magnitude of the current is the same for both the negative channel 207 and the positive channel 205.

The digital value is provided to the current-to-power conversion module, 218 or 211, where the current flowing across the semiconductor junction is used to determine the nearly instantaneous value of the power dissipated within the junction. This value of power dissipation is output as a power dissipation value and provided to the low pass filter module 212 and 220. The filtered power dissipation value is provided to the power-to-temperature conversion module, 222 or 214. The power-to-temperature conversion module, 222 or 214 converts the filtered values of the power dissipated in the semiconductor junction into a value of the junction temperature 113a or 113b and provides this as temperature output signal 115a or 115b, respectively. The temperature outputs signals 115a and 115b are provided to the comparator module 112, in which the filtered temperature values are compared to a predetermined threshold value via comparators 216 and 224 and from which comparator outputs 117a and 117b are provided. Output logic module 116 receives the comparator outputs 117a and 117b and in the event that either comparator output signal exceeds the predetermined threshold, output logic 116 provides an alarm signal 118 that indicates that a semiconductor junction in the first or second transistor, 104 or 106 respectively, is overheating. The order of the low pass filter and power to temperature modules can be interchanged without affecting the accuracy of the estimated temperatures.

Figure 3:
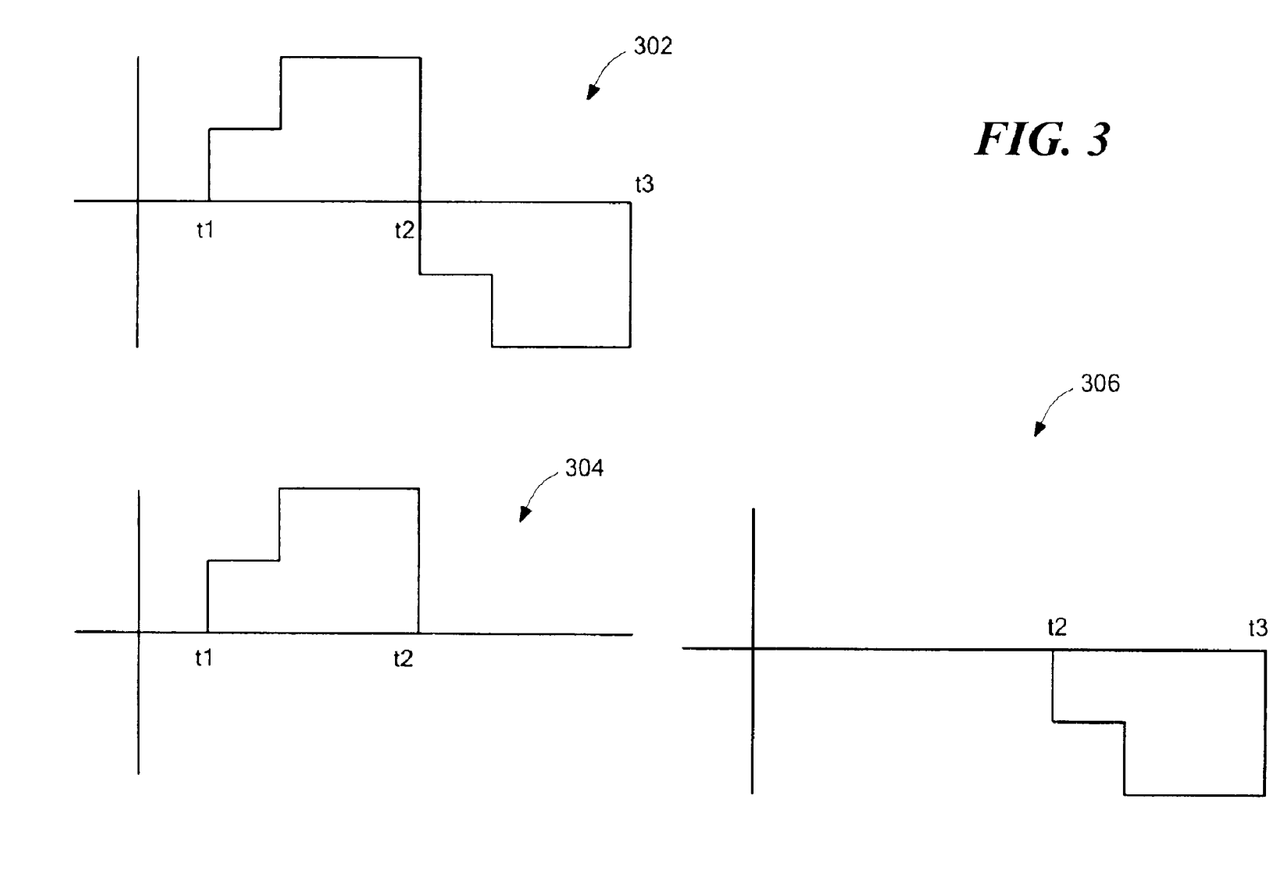
FIG. 3 is a graphical representation of current waveforms that are propagated through the embodiment of the invention depicted in FIG. 2.

FIG. 3 depicts a current waveform 402 that has been sampled and digitized and passed to switching logic 206. The positive current waveform 304 that is greater than zero from t1 to t2 is processed by the positive channel 205. The negative current from t2 to t3 is provided to the absolute value module 208 and the magnitude of the negative current waveform is provided as waveform 306 and is processed by the negative channel 207 between time t2 and t3. As discussed above, this allows the current from the first and second transistors 104 and 106, respectively, to be processed individually.

As discussed above, the current-to-power modules 210 and 218 convert the magnitude of the current flowing across the corresponding semiconductor junction into the amount of power that is dissipated within the corresponding semiconductor junction. The exact formulas used in the current-to-power modules 210 and 218 depend upon several factors that include the type of the corresponding semiconductor device 104 and 106, e.g. a BJT, MOSFET, or IGBT and the particular type of mounting that is used to secure the semiconductor device. In general, the current to power transformation includes three components that are summed together to form the power dissipated in the semiconductor junction as a function of the junction current. The first component is a constant representing the various power losses in the corresponding semiconductor device at zero signal. The second component is proportional to the current and represents the switching losses and in the case of an IGBT much of the saturation loss. Typically, the switching losses depend on the supply voltage and switching frequency, but in general these values can be combined into a single constant coefficient. The third component is proportional to the square of the current and represents the saturation losses of a MOSFET, a portion of the saturation losses of an IGBT, and a portion of the switching losses as well. In one embodiment, the temperature to power conversion is determined according to the following formula:

$$P_{Loss_i} = K_1 * I_i + K_2 * (I_i)^2 + K_3. \quad (1)$$

Where: i is the sampling period, $K_1=1.32$, $K_2=0.011$, and $K_3=210$, and $I_i$ is the current in sample period i.

The power dissipation across the semiconductor junction is converted into the semiconductor junction temperature in power-to-temperature modules 212 and 220. In general, power can be transformed into temperature by multiplying the power dissipated in the semiconductor junction by the thermal resistance in degrees of ° C./watt from the junction to the heat sink. In the illustrated embodiment the power to temperature conversion is determined according to the following formula:

$$T_j = P_{Loss_i} * \partial_J. \quad (2)$$

Where $\theta_J=0.075$ ° C./Watt. Alternatively, the conversion to temperature can use a coefficient that is set to an arbitrary scale wherein the reference values must be adjusted to the arbitrary scale as well.

When a step of current is applied to a semiconductor junction, the power dissipation across the junction will increase almost instantly in conjunction with the current, but the temperature in the semiconductor junction will change over a longer period of time. In particular, the in the semiconductor junction temperature will increase very rapidly at first and then later, as the heat spreads to the substrate of the semiconductor device, the temperature will increase more slowly. Thus, the temperature increase is similar to the $(1-e^{-rt})$ step response of a low pass filter. In order to model the temperature increase of a semiconductor junction, a low pass filter having an appropriate time constant or time constants may be used. In reality as many as five time constants may be required covering a nearly 100:1 range in values to model the temperature increase extremely accurately. However, for the purposes of the present invention in which the protection of the semiconductor junction is sought, three time constants have been found to be sufficient.

A low pass digital filter that is suitable for use with the semiconductor junction estimation apparatus described herein is preferably a parallel digital filter having three sections. Each section is a first order low pass filter having a 6 dB/octave roll off and a time constant that is related to the temperature increase discussed above. Typically, each section of the filter has the same structure, i.e. has the same form of input-output equation, but utilizes different constants. The input output relationship of each section of the filter is given by:

$$Y_s = b_{0s} * X(n) + b_{1s} * X(n-1) + a_{1s} * Y_s(n-1), \quad (3)$$

Where s is the section number (1,2,3); n is the present sample; and n-1 is the previous sample. Accordingly, the input-output equations for all three sections are given by:

$$Y_1 = b_{01} * X(n) + b_{11} * X(n-1) + a_{11} * Y_1(n-1),$$

$$Y_2 = b_{02} * X(n) + b_{12} * X(n-1) + a_{12} * Y_2(n-1),$$

$$Y_3 = b_{03} * X(n) + b_{13} * X(n-1) + a_{13} * Y_3(n-1) \quad (4)$$

If more accurate results are needed, additional sections may be added to the digital filter having other time constants that are representative the other previously ignored temperature effects.

In the illustrated embodiment, the values for the various filter constants are provided in Table 1 below.

TABLE 1

| | |
|---|---|
| b01 = | 0.0003461320 |
| b11 = | 0.0003461320 |
| a11 = | 0.9969100000 |
| b02 = | 0.0000207233 |
| b12 = | 0.0000207233 |
| a12 = | 0.9997620840 |
| b03 = | 0.0000101367 |

TABLE 1-continued

| | |
|---|---|
| b13 = | 0.0000101367 |
| a13 = | 0.9999663060 |

The comparator module 112 includes a pair of digital comparators that compare the filtered temperature values 115a and 115b to a predetermined temperature constant. In the illustrative embodiments described herein the predetermined constant is a function of the maximum junction temperature minus the cold plate temperature, and in this embodiment, the maximum junction temperature is 110° C.

Figure 4:
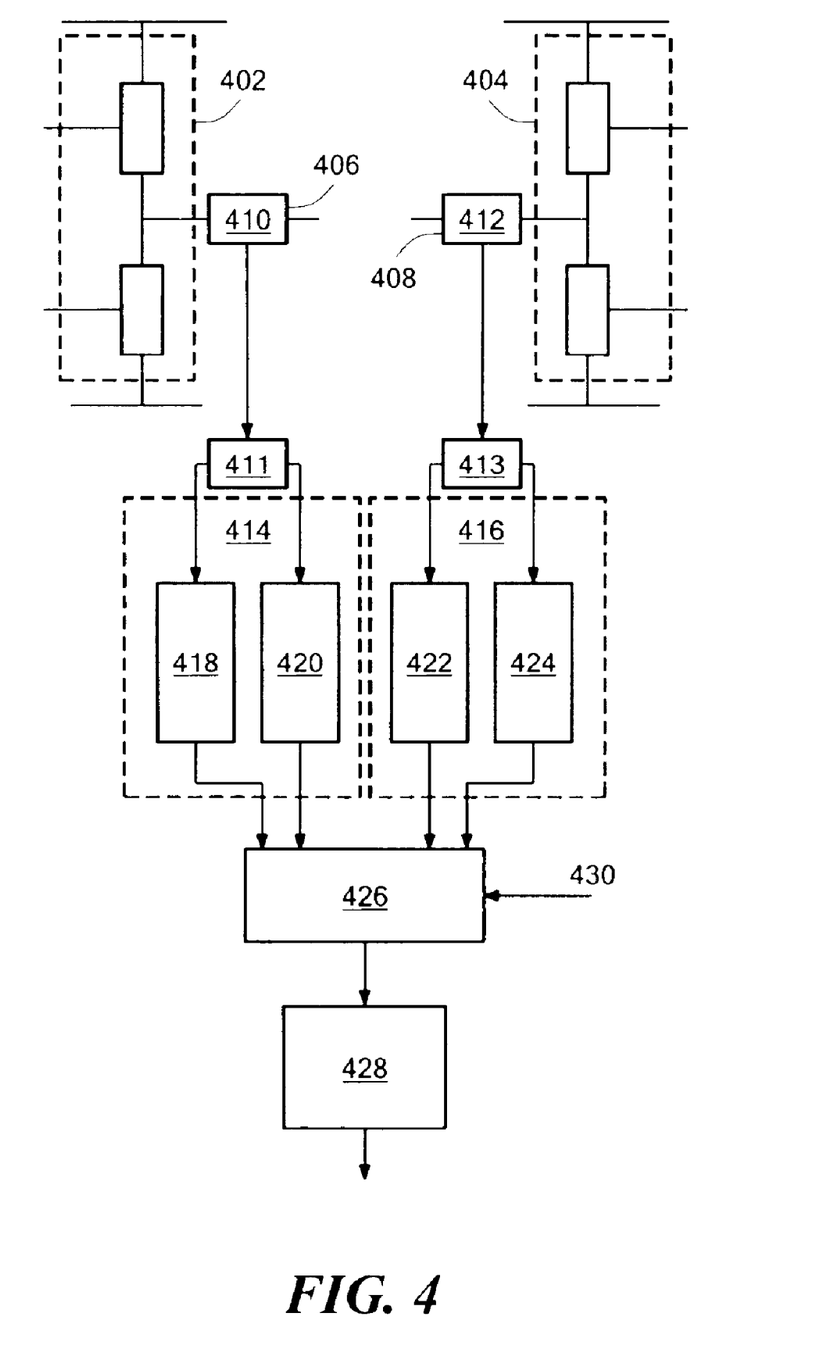
FIG. 4 is another embodiment of the present invention.

Although the semiconductor junction temperature estimator has been described for a pair of transistors, the semiconductor junction temperature estimator described herein can be adapted and used with other circuit configurations as well. For example, a full wave bridge rectifier is depicted in FIG. 4 having four transistors. A first pair of transistors 402 provides a first output current to first output 406 and a second pair of transistors 404 provides a second output current to second output 408. First and second current sensors 410 and 412 respectively sense the first and second output currents, and the sensed current is provided to first and second semiconductor junction temperature estimator modules 414 and 416 that operate as described above. The first semiconductor junction temperature estimator modules 414 includes positive and negative channel processors 418 and 420, respectively, and the second semiconductor junction temperature estimator modules 416 includes positive and negative channel processors 420 and 422, respectively. The positive and negative filtered temperature signals from the semiconductor junction temperature estimator modules 414 and 416 is provided to output module 426 that provides an output alarm signal 428 in the event that any of the positive and negative filtered temperature signals from the semiconductor junction temperature estimator modules 414 and 416 exceeds a predetermined constant value 430. In this way, all four transistors are individually monitored.

The semiconductor junction temperature estimator can also be used with circuit configurations in which several pairs of transistors are used to provide a component or portion of an output current that is in excess of what any single pair could provide. In this embodiment, the portion of the output current provided by each pair of transistors is sensed and processed as described above so that the semiconductor junction temperature of each pair of transistors is monitored for overheating.

Figure 5:
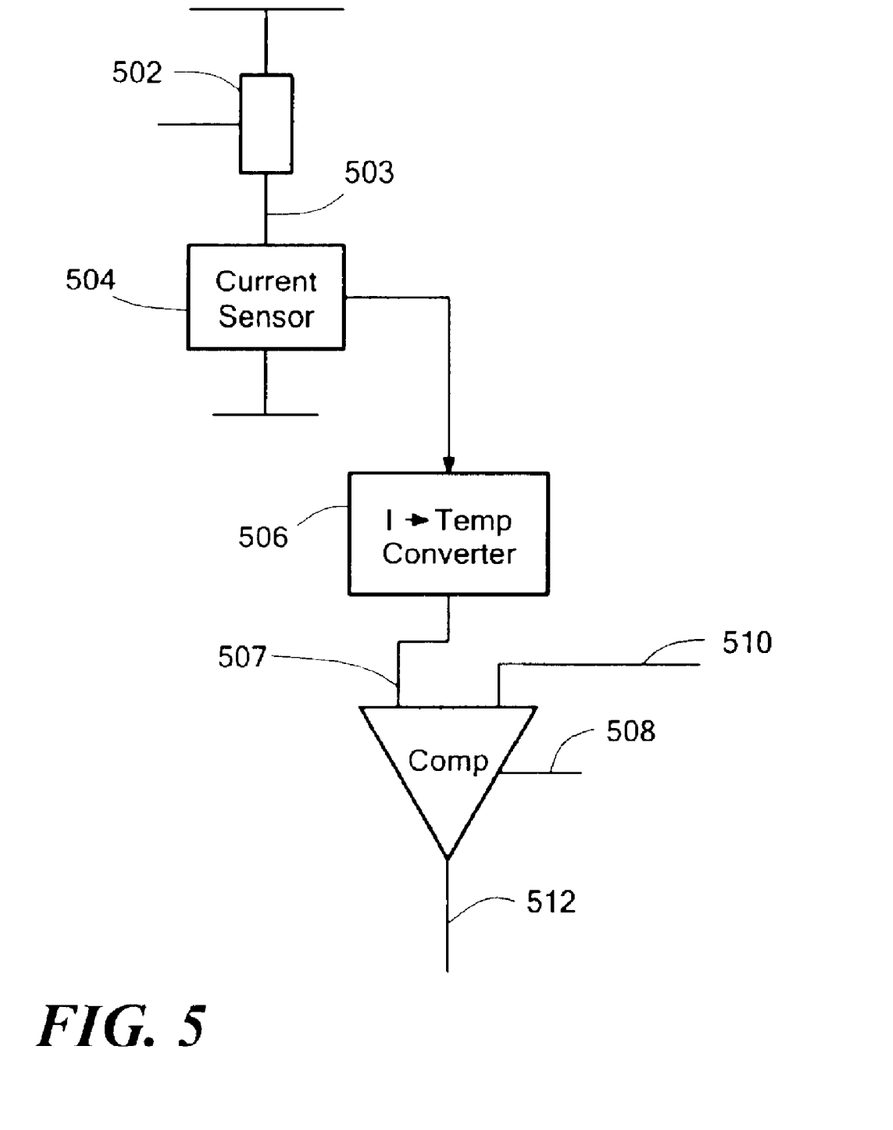
FIG. 5 is a further embodiment of the present invention.

In some circumstances, it may be desirable to estimate the semiconductor junction temperature of a single transistor having both positive and negative current flowing across the semiconductor junction. In this embodiment that is depicted in FIG. 5, the output current 503 of transistor 502 is sensed by current sensor 504 and provided to current-to-temperature converter 506. The current-to-temperature converter 506 provides a filtered temperature output signal to a comparator 508 that compares the filtered temperature output signal to a predetermined constant 510. In the event that the filtered temperature output signal exceeds the predetermined constant 510, an output alarm signal 512 is provided.

Figure 6:
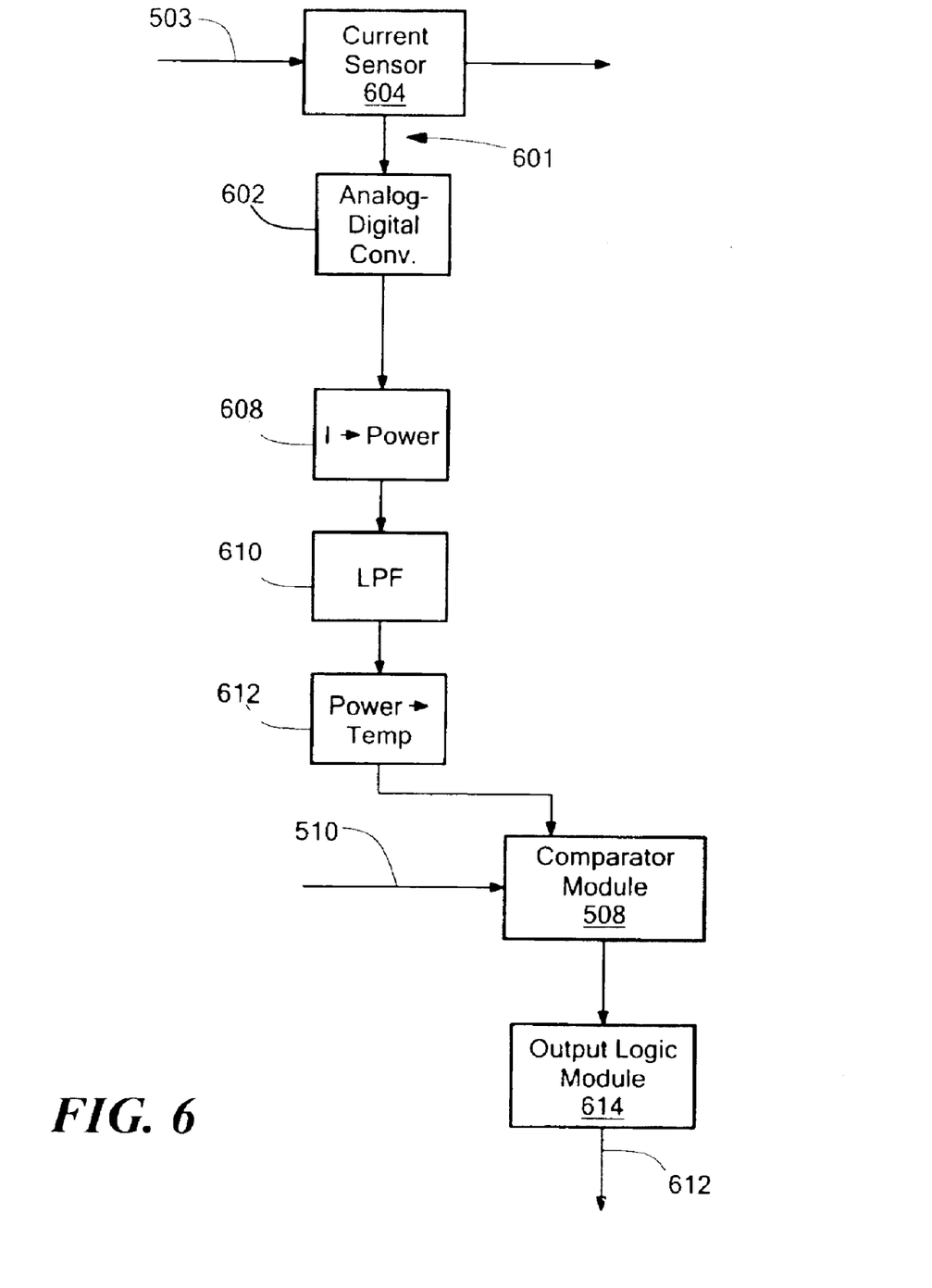
FIG. 6 depicts the current-to-temperature converter of FIG. 5 in more detail.

FIG. 6 depicts the current-to-temperature converter 506 of FIG. 5. In particular, output current 503 is sensed by current sensor 504 that provides an analog signal 601 that is indicative of the magnitude and polarity of output current 503. Signal 601 is provided to an analog-to-digital converter 7602 that may include a sample and hold module, or if needed an external sample and hold module may be used. Analog-to-digital converter 602 converts the analog signal 601 into a digital value that is a digital representative of the magnitude and polarity of the analog signal 601 and therefore output current 503. The digitized value from analog-to-digital converter 602 is provided to the current-to-power conversion module 608 where the current flowing across the semiconductor junction is converted into the power dissipated within the junction and output as a power dissipation value. The power dissipation value is provided to the low pass filter module 610 where the power dissipated in the semiconductor junction is filtered to remove high frequency components and to more effectively model the physical heat transfer. This filtered power dissipation value is provided as an output to the power-to-temperature conversion module 612. The power-to-temperature conversion module 612 receives the filtered power dissipation value and provides a temperature output signal. The temperature output signal is provided to the comparator 508, in which the filtered temperature value is compared to a predetermined threshold 510. In the event that the filtered temperature output signal exceeds the predetermined threshold, output logic module 614 generates alarm signal 512 indicating that a semiconductor junction in the transistor 502 is overheating. In the illustrative embodiment, switching losses are assumed to be small such that the term proportional to the current in equation (1) is negligible. Accordingly, the squared current term dominates equation (1) and the polarity of the current does not matter. However, if the switching losses are not negligible, then by equation (1) a negative current reduces the estimated temperature of the semiconductor junction since the switching loss term has the opposite sign from the squared term. In this case, an absolute value module should be inserted in the system between the analog to digital converter 602 and the current-to-power module 608 to ensure that the signs of all the terms in equation (1) are consistent and that an accurate estimate of junction temperature is made.

The embodiments described above are preferably executed in a digital signal processing system that includes a digital signal processing (DSP) chip, memory for storing commands and data, and interface electronics. The above modules are coded as routines having instructions that are executed by the DSP chip. The relative order of the modules themselves can be changed for example, filtering the output of the power-to-temperature module instead of the input. A suitable signal processor chip is the TMS320241FN manufactured by Texas Instruments. However, it should be apparent to those of skill in the art, that analog electronic circuits can be designed and employed to carry out and execute the calculations in the above-described modules as well.

Those of ordinary skill in the art should further appreciate that variations to and modification of the above-described methods and apparatus for a semiconductor junction temperature estimator may be made without departing from the inventive concepts disclosed herein. For example, the constants given in the above embodiments for the current-to-power conversion, the power-to-temperature conversion, and the digital filters are particularly suited to the illustrative embodiment. Other circuit configurations, using different semiconductor devices, and different mounting and cooling techniques will have different constants. In addition, if more accuracy is required more time constants can be determined and the order of the digital low pass filters increased to accommodate the added time constants. In addition, although the illustrative embodiments depict a system in which the positive and negative channels use the same constants in processing the current data, this does not have to be, and as discussed above, different semiconductor devices used in the circuit being monitored will require different constants in the equations. Accordingly, the invention should be viewed as limited solely by the scope and spirit of the appended claims.

What is claimed is:

1. An apparatus for estimating a semiconductor junction temperature of a corresponding semiconductor device coupled to an output node to provide an output current, the apparatus comprising:

a current sensor coupled to the output node, the current sensor operative to sense said output current and to provide an output current signal indicative of the magnitude and polarity of said output current;

a processor coupled to the output of the current sensor to receive the output current signal therefrom and operative to provide a temperature signal that is a function of the output current signal, wherein the temperature signal is an estimate of the semiconductor junction temperature in the semiconductor device; and an output module coupled to the processor and receiving the temperature signal therefrom and operative to compare the temperature signal to a predetermined constant, and in the event that the temperature signal exceeds the predetermined constant, providing an output alarm signal indicative that the semiconductor junction is overheating in the semiconductor device, wherein the processor includes:

a current-to-power converter coupled to an absolute value module and operative to provide a value of the power dissipated in the semiconductor junction of the semiconductor device as a function of the magnitude of the output current signal;

a low pass filter coupled to the current-to-power converter and receiving the value of the power dissipated in the semiconductor junction in the semiconductor device as an input and operative to filter the received value and to provide as an output a filtered power value; and a power-to-temperature converter coupled to the low pass filter and receiving the filtered power value, the power-to-temperature converter operative to provide a value of the temperature of the semiconductor junction in the semiconductor device as a function of the filtered power value.

2. An apparatus for estimating a semiconductor junction temperature of a corresponding first and second semiconductor device coupled together to a common node to provide a positive portion and a negative portion, respectively, of an output current, the apparatus comprising:

a current sensor coupled to the common node, the current sensor operative to sense said output current and to provide an output current signal indicative of the magnitude and polarity of said output current;

a switching module coupled to the current sensor arid operative to provide the output current signal to a first output in the event that the output current signal has a positive polarity and to provide the output current signal to a second output in the event that the output current signal has a negative polarity;

a positive channel processor coupled to the first output of the switching module to receive the output current signal and operative to provide a first temperature signal that is a function of the output current signal, wherein the first temperature signal is an estimate of the semiconductor junction temperature in the first semiconductor device;

a negative channel processor coupled to the second output of the switching module to receive the output current signal and operative to provide a second temperature signal that is a function of the output current signal, wherein the second temperature signal is an estimate of the semiconductor junction temperature in the second semiconductor device; and an output module coupled to the positive and negative channels and receiving the first and second temperature signals therefore arid operative to compare the first and second temperature signals to a predetermined constant, and in the event that either the first or second temperature signals exceeds the predetermined constant, providing an output alarm signal indicating that the semiconductor junction is overheating in the corresponding first and second semiconductor device.

3. The apparatus of claim 2 wherein the positive channel processor includes:

a current-to-power converter coupled to the first output of the switching module and operative to provide a value of the power dissipated in the semiconductor junction of the first semiconductor device as a function of the output current;

a low pass filter coupled to the current-to-power converter and receiving the value of the power dissipated in the semiconductor junction of the first semiconductor device as an input and operative to filter the received value and to provide as an output the filtered power value a power-to-temperature converter coupled to the low pass filter and receiving the filtered power value, the power-to-temperature converter operative to provide a value of the temperature of the semiconductor junction in the first semiconductor device as a function of the filtered power value.

4. The apparatus of claim 2 wherein the negative channel processor includes:

an absolute value module coupled to the second output of the switching module to receive the output current signal therefrom and operative to provide as an output the absolute value of the magnitude of the output current;

a current-to-power converter coupled to the absolute value module and receiving the absolute value of the magnitude of the output current therefrom and operative to provide a value of the power dissipated in the semiconductor junction of the second semiconductor device as a function of the absolute value of the magnitude of the output current;

a low pass filter coupled to the current-to-power converter and receiving the value of the value of the power dissipated in the semiconductor junction of the second semiconductor device as an input and operative to filter the received value and to provide as an output the second filtered power value a power-to-temperature converter coupled to the low pass filter and receiving the filtered power value therefrom and operative to provide a value of the temperature of the semiconductor junction in the second semiconductor device as a function of the filtered power value.

5. The apparatus of claim 3 or 4 wherein the current-to-power converter determines the power dissipated in the respective semiconductor junction according to:

$$P_{Loss_i} = K_1 * I_i + K_2 * (I_i)^2 + K_3.$$

6. The apparatus of claim 5 wherein i is the sampling period, $K_1=1.32$, $K_2=0.011$, and $K_3=210$.

7. The apparatus of claim 3 or 4 wherein the power-to-temperature converter determines the temperature of the semiconductor junction according to:

$$T_i = P_{Loss_i} * \partial_j.$$

8. The apparatus of claim 7 wherein $\theta_j = 0.75°$ C./Watt.

9. The apparatus of claim 3 or 4 wherein the low pass filter is a low pass filter having 3 distinct time constants.

10. The apparatus of claim 9 wherein the low pass filter having three distinct time constants is a digital filter having 3 sections each having an output Y1, Y2, and Y3 respectively and wherein the output of the low pass filter is the sum of Y1, Y2, and Y3 and wherein the input-output equations for each section are given by:

$$Y_1 = b_{01} * X(n) + b_{11} * X(n-1) + a_{11} * Y_1(n-1)$$

$$Y_2 = b_{02} * X(n) + b_{12} * X(n-1) + a_{12} * Y_2(n-1)$$

$$Y_3 = b_{03} * X(n) + b_{13} * X(n-1) + a_{13} * Y_3(n-1).$$

11. The apparatus of claim 10 wherein the constants in the input output equations are given by:

| | |
|---|---|
| b01 = | 0.0003461320 |
| b11 = | 0.0003461320 |
| a11 = | 0.9969100000 |
| b02 = | 0.0000207233 |
| b12 = | 0.0000207233 |
| a12 = | 0.9997620840 |
| b03 = | 0.0000101367 |
| b13 = | 0.0000101367 |
| a13 = | 0.9999663060. |

12. A method for estimating a semiconductor junction temperature of a corresponding first and second semiconductor device Coupled together to a common node to provide a positive portion and a negative portion, respectively, of an output current, the apparatus comprising:

sensing the magnitude and polarity of the output current;

switching the output current signal to a first output in the event that the output current signal has a positive polarity or to a second output in the event that the output current signal has a negative polarity;

processing the magnitude and polarity of the sensed output current from the first output to provide a first temperature signal that is a function of the output current signal and is an estimate of the semiconductor junction temperature in the first semiconductor device;

processing the magnitude and the polarity of the sensed output current from the second output to provide a second temperature signal that is a function of the output current signal and is an estimate of the semiconductor junction temperature in the second semiconductor device; and detecting whether the first and second temperature signals exceed a predetermined constant; and in the event that either the first and second temperature signals exceeds the predetermined constant, providing an output alarm signal indicative that the semiconductor junction in the is overheating in the corresponding first and second semiconductor device.

13. The method of claim 12 wherein the step of processing the magnitude and polarity of the sensed output current from the first output includes:

determining the value of the power dissipated in the semiconductor junction of the first semiconductor device as a function of the output current;

filtering the value of the power dissipated in the semiconductor junction of the first semiconductor device using a low pass filter to provide as an output the filtered power value; and determining the value of the value of the temperature of the semiconductor junction in the first semiconductor device as a function of the filtered power value.

14. The apparatus of claim 12 wherein the step of processing the magnitude and polarity of the sensed output current from the first output includes:

determining the absolute value of the output current signal;

determining the value of the power dissipated in the semiconductor junction of the second semiconductor device as a function of the absolute value of the output current signal;

filtering the value of the power dissipated in the semiconductor junction of the second semiconductor device using a low pass filter to provide as an output the second filtered power value; and determining the value of the value of the temperature of the semiconductor junction in the second semiconductor device as a function of the second filtered power value.

15. An apparatus for predicting a semiconductor junction temperature of a semiconductor device in a high power full bridge amplifier having first and second semiconductor devices coupled to a first output and providing positive and negative components of a first output current respectively, and third and fourth semiconductor devices coupled to the second output and providing positive and negative components of a second output current respectively, the apparatus comprising:

first and second switching modules coupled to the first and second current sensors respectively, and each operative to provide the output current signal to a first output in the event that the output current signal has a positive polarity and to provide the output current signal to a second output in the event that the output current signal has a negative polarity;

first and second positive channel processors coupled to the first output of the first and second switching modules respectively, each to receive the output current signal and each operative to provide a first temperature signal that is a function of the first and second output current signals respectively, wherein each of the first temperature signals is an estimate of the semiconductor junction temperature in the first and third semiconductor devices respectively;

first and second negative channel processors coupled to the second output of the first and second switching modules, respectively, each to receive the respective output current signal and each operative to provide a second temperature signal that is a function of the output current signal, wherein the second temperature signal is an estimate of the semiconductor junction temperature in the second and fourth semiconductor devices respectively; and an output module coupled to the positive and negative channels and receiving the first and second temperature signals from each and operative to compare the first and second temperature signals from each to a predetermined constant, and in the event that any of the first or second temperature signals exceeds the predetermined constant, providing an output alarm signal indicative that the semiconductor junction in the is overheating in the corresponding first and second semiconductor device.

16. A method for estimating a temperature of a junction of a semiconductor device coupleable to an output node to provide an output current, the method comprising the steps of:

provic a virtual current waveform, to a user input current module, the virtual current waveform having a magnitude and a polarity representative of the output current of the semiconductor device;

taking an absolute value of the virtual current waveform;

generating a virtual junction temperature signal by a processor, including the sub-steps of computing and summing individual components of virtual power losses in the junction as a function of the virtual current waveform and the absolute value of the virtual current waveform;

comparing the virtual junction temperature signal to a predetermined constant; and in the event the virtual junction temperature signal exceeds the predetermined constant, providing an indication of potential semiconductor junction.

17. The method of claim 16 wherein the step of generating the virtual junction temperature signal further includes:

low pass filtering a value of the virtual power losses in the junction of the semiconductor device using time constants representative of an actual junction temperature of the semiconductor device.

18. A system for estimating a semiconductor junction temperature of a corresponding semiconductor device coupled to an output node to provide an output current comprising:

a processor and a memory, the memory containing program code, the processor being operative to execute program code contained within the respective memory;

said program code within said memory being operative to:

receive as an input the output current waveform;

estimate the temperature of the semiconductor junction temperature in the semiconductor device as a function of the output current waveform; and compare the estimated temperature to a predetermined constant, and in the event that the temperature signal exceeds the predetermined constant, providing an output alarm signal indicative that the semiconductor junction in is overheating in the semiconductor device.

19. The system of claim 18 wherein the program code operative to estimate the semiconductor junction temperature in the semiconductor device includes program code to:

determine a value of the power dissipated in the semiconductor junction of the semiconductor device as a function of an absolute value of the output current;

filter the value of the power dissipated in the semiconductor junction of the semiconductor device using a low pass filter and providing a filtered power value; and determine the temperature of the semiconductor junction in the semiconductor device as a function of the filtered paver value.

* * * * *